Oct. 24, 1944.  S. S. STOLP  2,361,358
VEHICULAR ACTUATED SWITCH
Filed March 4, 1942

INVENTOR
SAMUEL S. STOLP
BY John L. Milton
ATTORNEY

Patented Oct. 24, 1944

2,361,358

UNITED STATES PATENT OFFICE 2,361,358

VEHICULAR ACTUATED SWITCH

Samuel S. Stolp, Louisville, Ky., assignor to Cheatham Electric Switching Device Co., Incorporated, Louisville, Ky., a corporation of Kentucky Application March 4, 1942, Serial No. 433,277

3 Claims. (Cl. 246—228)

My invention relates to an electrically operated switch tongue for directing the course of travel of an electrically propelled vehicle and/or a current collector carried thereby, said switch tongue being actuated by current controlled by apparatus responsive to an approaching vehicle and has particular reference to trolley systems supplying current to track and dirigible vehicles which receive current from a trolley wire or trolley wires.

More specifically my invention is for use in connection with switching apparatus that is automatically operated on the principle of "power-on" or "power-off" the car motors to provide automatic selection in the operation of a switch tongue to direct the course of travel of a track vehicle or of current collectors, respectively.

Since this invention can be employed in connection with switch tongues of either track switches or overhead trolley frogs or both of same simultaneously, it is to be understood that specific designation of one or the other systems shall not be applied in a restrictive sense.

One object of my invention is to provide apparatus for directing the course of travel of a vehicle wherein electrical and electro-mechanical actions follow the engagement of a vehicle current collector with a trolley contactor. These actions consist of: Making a selection for the operation of the switch tongue to effect the desired direction of travel, this is followed by an immediate energization of a switch tongue actuating solenoid through a "pick-up" or an initiating circuit, this in turn is followed by energization through a "stick" or operating circuit; however, the application of current through the latter circuit is prolonged a predetermined period of time independent of the pick-up circuit and the speed of travel of the vehicle current collector to effect a positive operation of the switch tongue.

A further object of my invention is to provide apparatus and circuits wherein immediately after the current collector engages the trolley contactor and closes a pair of contacts thereon, a circuit controlled by said contacts effects energization of said operating solenoid and through another pair of contacts, simultaneously includes another circuit that prolongs and interrupts the operating current flowing to said solenoid, which solenoid operates the switch tongue apparatus after the first pair of contacts separate and open the circuit controlled thereby and before said second set of contacts can be separated.

Since the apparatus employed herein is for normally open circuit use on electric railway systems operating on 600 volts direct current and is intentionally constructed for abnormal overload momentary use only, another object of my invention is to provide novel means for protecting the relays, solenoids and circuits connected thereto against destruction from excessive heat that would follow in the event the vehicle carrying a current collector is brought to an unintended or accidental stop with the current collector in engagement with the trolley contactor, whereby a portion of the apparatus is retained under electrical excitation.

The advantages of these and other objects will become apparent as the following description is read in connection with the accompanying drawing in which.

This invention is primarily intended for use in connection with vehicles that are operated by means of electrical current transmitted through an overhead trolley conductor and collected by a trolley wheel, or current collector carried by a vehicle although it will be evident that this invention can be operated by other methods.

Figure 3:
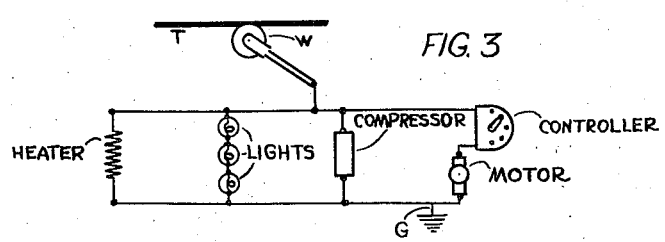
Figure 3 is a schematic drawing showing the conventional circuits usually found in an electrically operated vehicle whether it be of the track or trackless type. These circuits are taken into consideration in describing the operation of the apparatus illustrated in Figs. 1 and 2.

Reference character T designates a trolley conductor usually connected to the positive terminal of a source of power. In Figure 3 the elements designated "heater," "lights," "controller" and "compressor" constitute the current consuming apparatus auxiliary to the "motor" for propelling the vehicle. All of these elements are taken into account in determining or effecting the operating characteristics of the selective relay KL, illustrated in the apparatus represented in Fig. 1.

As indicated in Fig. 3, the propulsion motor for the vehicle is controlled by the car controller actuated by the car operator for regulating the amount of current supplied to the propulsion motor of the vehicle.

As illustrated in Figure 3, the aforesaid propulsion motor and auxiliaries are each electrically connected so as to receive operating current from the positive trolley conductor T via the trolley wheel W and the track circuit of negative potential indicated by the conventional negative symbol designated by symbol G. For those familiar with the art, it will be understood that in order to use this apparatus for trackless trolley systems the electrical connection to the negative conductor can be provided via a second overhead trolley conductor, paralleling the positive conductor, and a second trolley collector carried by the vehicle.

Reference character T designates a trolley conductor for supplying current to an electrically propelled vehicle. W designates a current collector or trolley in the form of a wheel, which traverses the trolley conductor and collects current for the operation of the electrical units of a conventional electric vehicle as indicated in Figure 3.

E designates the lifting beam of a conventional trolley switch or contactor C for engagement with stationary contact 7 to provide a trolley switch for closing a normally open circuit only during the passage of a current collector over the beam.

Figure 1:
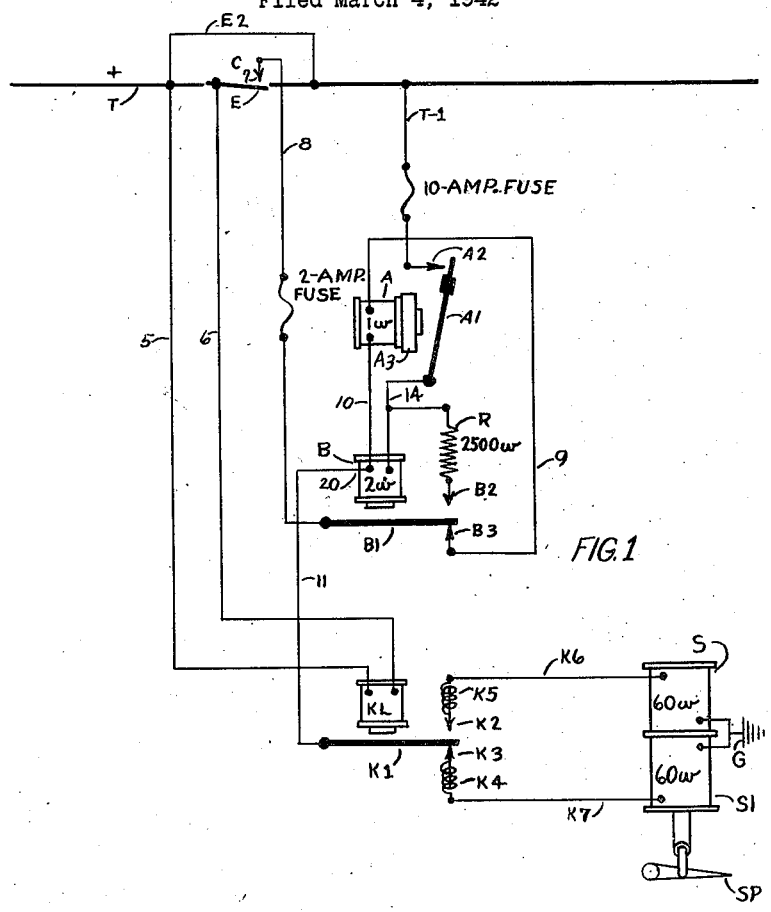
Figure 1 is a schematic drawing showing the circuits and cooperating apparatus of a preferred embodiment of my invention for use by track or trackless systems having both through or straight line and turnout courses of travel that are in regular alternate use.

With special reference to Fig. 1: Since the apparatus employed in this system operates on the well known principle of power-on for the curve or turn-out route and power-off for the straight course as adverted to at the outset of this specification, the apparatus for the automatic selection of the operation of the switch tongue consists of a selective relay KL, shown connected to trolley conductor T by wire 5 and to the lifting beam E by wire 6. Thus, it will be observed that when the trolley collector W traverses the trolley wire with power on and engages lifting beam E, current will be taken through the series coil of the KL relay thereby lifting the armature K1 from the back contact K3 to the front contact K2 where operating current from another part of the system will be directed to holding coil K5 and wire K6 to operating coil S of the switch point operator and thence to ground or return circuit. Immediately upon the de-energization of the holding coil K5, the armature K1 will drop to the back contact. It should be noted that in the event the vehicle engages the lifting beam without drawing power for the motors, that the KL relay and the coil thereof are so organized that armature K1 will not be lifted from the back contact K3 through which operating current will be conducted and thence on through holding coil K4, wire K7, winding S1 of the ground magnet to ground or return circuit thereby setting or retaining the switch point for the straight through course of travel.

The lifting beam E is connected to the trolley conductor T through the coil of relay KL and wires 5—6, therefore, when contact E—7 is closed current will pass through wire 8 to armature B1, back contact B3, wire 9, winding of relay A, wire 10, wire 11, to armature K1, to supply the initiating operating current to coils S or S1 of the ground magnet and to simultaneously supply the initiating or pickup current for slow release relay A. This relay is slow acting by reason of slug or choke A3. The energization of relay A actuates armature A1 and establishes a contact through stationary contact A2 connected to trolley conductor T by wire T1, thereby delivering positive potential current from the trolley conductor for the operation of the switch point by way of wire T1, contact A2, armature A1, wire 14, winding of relay B to wire 11 and thence to the ground connection G as explained supra.

It should be noted that the circuits controlled by contacts E, 7 and A1, A2 are closed when A1 and A2 are engaged. This is before armature B1 leaves contact B3 and opens the initiating circuit also controlled thereby. Therefore, during this very short period of time, actuating current is simultaneously applied through both of these circuits to the switch point operating solenoid connected to armature K1, using either K6 or K7 from the armature. Thus, it will be perceived that operating current for the selected ground magnet solenoid is first applied through one circuit, the normally open one controlled by contacts E, 7, then through two circuits, the one just mentioned and the normally open circuit controlled by contacts A1, A2; and then as the collector is carried beyond beam E, contacts E, 7 open the first initiating operating circuit carrying current (also stick circuit controlled from contact B2) to the selected ground magnet solenoid and the operating current is then supplied entirely through the second circuit, the one controlled by contacts A1, A2. Upon the slow demagnetization of relay A, due to the influence of choke A3, the entire operating current to the ground magnet solenoid is disrupted and the arc incident to this operation is formed between contacts A1 and A2 and minimized by the presence of the magnetic blowout referred to supra. In the interest of protecting contactor C, the incident system is organized to prevent the initiating current from flowing to the operating solenoid for a sufficient length of time to operate the switch point, it should also be noted that this current could effect this operation independently of the current supplied upon the closing of contacts A1, A2. Obviously, such an operation would destroy the contactor since this system employs 10 amperes of current at 600 volts.

With the energization of relay B, armature B1 engages contact B2 thereby instantly opening the initiating or pickup circuit through contact B3, wire 9, winding of relay A and wire 10, while winding of relay B remains energized, since the circuit from the trolley conductor through wire T1, contact A2, armature A1, wire 14, remains energized a predetermined time before interrupting the flow of current to the switch point operating solenoid at contacts A1, A2. The latter are equipped with the magnetic blowout, obviously provided for protecting the contact elements against a highly disruptive arc. It should be noted that by this arrangement only an inconsequential arc occurs at the contact points of contactor C when the lifting beam is dropped to normally open position upon the passing of the collector. In the event the vehicle comes to rest with the trolley collector retaining contacts E—7 closed, current will flow through said contacts, wire 8, armature B1, contact B2, resistor R, winding of coil B, wire 11, armature K1 to ground through the switch point operating circuit. With the high ohmic resistor R in series with coil of relay B and coil of the switch point operator, only a negligible amount of current will be flowing therethrough, thus protecting this circuit from destruction by a heavy amperage current which the system is organized to carry momentarily. It will be noted that with the switch B1—B3 open, switch A1—A2 will also be open and that current cannot flow to the switch point operating windings when this condition prevails.

"Holding coils" designated by characters K4, K5 are to be understood as indicating electromagnets for firmly holding armature A1 against movement while current is flowing to the selected switch point operating coil, thus preventing false operations and arcing at the related contact points.

It should also be noted that by the employment of low resistance relay coils of relays A and B, substantially lower than the switch operating solenoid coils, the possibility of short or open circuits and burnouts is reduced to a minimum. This arrangement provides a low resistance electrical path directly to ground to lessen the leakage resistance and reduce the required insulation on the trolley contactor. These advantages will be appreciated when it is taken into consideration that these instrumentalities are handling direct current of 600 volts. The use of relatively large size magnet wire for the solenoids of the actuating relays results in lower impedance thereof and effects a very quick action resulting from the low voltage pickup of the said relays. This arrangement also provides the maximum magnetic saturation of the slow release controlling relay thereby providing full saturation for the track switch operating solenoids in a minimum time period.

Figure 2:
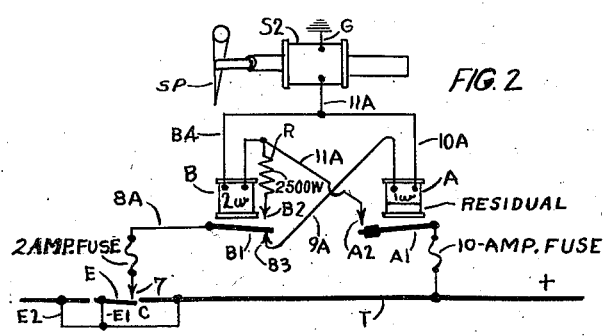
Figure 2 is similar to Figure 1 except that the diagram is in a simplified form and shows a preferred embodiment of my invention for regular straight line travel where a switch tongue is occasionally manually set for a turnout course of travel for the vehicle such as at a car barn and is employed as a protective device against the operator having left the manual switch for the turnout closed.

In Figure 2 the apparatus necessary for selective operation to direct a vehicle to a straight line or curved route, also the coil for operating the switch point to the straight course, have been omitted. The use for which this specific apparatus is put is found in locations where the switch point is manually thrown to the curve route to direct the car from the main track to a barn or other infrequently used course. Since manual operation of this type must be carried on by an operator standing in the street and exposed to traffic, he has frequently been known to be so concerned with his personal safety that he neglects to turn the switch point to the straight through route, thereby exposing the traveling public to a hazard, therefore, the apparatus shown by Figure 2 is installed so that each time a current collector engages the trolley contactor C and closes switch E1—E7, initiating or pickup current flows through wire 8A to armature B1, back contact B3, wire 9A, winding of relay A, wire 10A, coil of switch point operator S2, to ground. The initiating current thus applied picks up armature A1 and closes switch A2 to continue operating current through winding S2 a predetermined time, via wire 11A, winding of relay B, wire B—4, wire 11A, coil of switch point operator S2 to ground.

The function of this circuit and the connected apparatus, as indicated by the same, or similar designating characters, are identical with that of Figure 1, it being remembered that the power on and power off selective apparatus has been omitted. In this figure the circuits controlled by contacts E, 7 and A1, A2, are closed when A1 and A2 are engaged incident to the closing of contacts on contactor C. This is before energization of the 2 ohm winding on relay B and when armature B leaves contact B3 for opening the initiating circuit. The description of the operation of Figure 1, above, can be read directly on this figure.

As a means of assisting in the understanding of the invention and the circuits for practicing same, the resistance values of each of the windings has been indicated on the drawing. Therefore, it will be noted that relay A will pick up on or actuate its armature at voltages beginning at 120 and that there will be only 2 volts at 120 volts and 10 volts at 600 volts line voltage across the terminals of the winding; and that relay B will operate at voltages beginning at 25, with .8 volt at 25 volts and 20 volts at 600 volts line voltage across the terminals of the winding, when normally operated the maximum current broken at B1, B3 will be 6.5 amperes at 6.5 volts at 600 volts line voltage.

It should also be noted that in the event the vehicle stops and retains contacts E—7 closed after the switch point operator has been actuated and contact points A1, A2 of slow release relay A opened, current continues to flow through wire 8, armature B1, contact B2, resistor R, wire 14, winding of relay B, wire 11, armature K1 through the switch point operator to ground. This condition will prevail until the car moves forward and opens contacts E—7 whereupon, by reason of the added resistance of R, windings on B and S or S1, less than 1/4 ampere will be broken at the contact points of contactor C.

With reference to Fig. 1 in the circuit including wires 5, 6, armature B1, wires 9, 10, 11 and coil of relay A controlled by contacts E—7, a two ampere fuse has been provided to protect the apparatus since a current of 10 amperes would be drawn in the event contacts A2—A1 should fail to close. As explained above, this circuit normally carries a single surge of current and of instantaneous value. A ten ampere fuse is placed in the full load circuit, associated with contacts A2—A1, to protect the apparatus against an overload. Fuses of like value are similarly placed and are shown in Fig. 2.

While I have shown and described a particular form of my invention, I desire it to be understood that changes may be effected thereon without departing from its spirit and scope as set forth in the appended claims.

I claim:

1. In a track switch operating system, comprising in combination; an actuating solenoid for operating the track switch; a normally-open circuit for initiating operating current to the said actuating solenoid; a second normally open circuit for continuing operating current to said actuating solenoid; a normally-open trolley contactor switch adapted to be closed by a trolley collector traversing said trolley contactor for energizing said first-mentioned circuit and simultaneously supply operating current therethrough to said actuating solenoid, said normally-open initiating circuit including the coil of a slow release relay having a switch for closing the circuit for continuing operating current to the track switch solenoid and a relay in said second mentioned circuit for opening said first mentioned circuit.

2. In a track switch operating system, comprising in combination; an actuating solenoid for operating the track switch; a normally-open circuit for initiating operating current to the said actuating solenoid; a second normally open circuit for continuing operating current to said actuating solenoid; a normally-open trolley contactor switch adapted to be closed by a trolley collector traversing said trolley contactor for energizing said first mentioned circuit and simultaneously supplying operating current therethrough to said actuating solenoid; said normally open initiating circuit including the coil of a slow release relay having a switch for closing a circuit that applies and continues another operating current to the track switch solenoid in said second mentioned circuit including a relay for first opening and then holding open the first mentioned circuit while the trolley contactor actuated by the trolley collector holds the initiating circuit closed.

3. In a track switch operating system, comprising in combination; an actuating solenoid for operating the track switch; a normally-open circuit for initiating operating current to the said actuating solenoid; a second normally open circuit for continuing operating current to said actuating solenoid; a normally-open trolley contactor switch adapted to be closed by a trolley collector traversing said trolley contactor for energizing said first mentioned circuit and simultaneously supplying operating current therethrough to said actuating solenoid, said normally-open initiating circuit including the coil winding of a slow release relay having a switch for closing the circuit for continuing operating current to the track switch solenoid, and a relay having a coil winding of sufficient capacity to carry the required current for said actuating solenoid in said second mentioned circuit and a switch for opening said first mentioned circuit.

SAMUEL S. STOLP.